United States Patent
Holmes-Higgin et al.

(10) Patent No.: US 11,256,711 B2
(45) Date of Patent: Feb. 22, 2022

(54) HYBRID WORKFLOW SYNCHRONIZATION BETWEEN CLOUD AND ON-PREMISE SYSTEMS IN A CONTENT MANAGEMENT SYSTEM

(71) Applicant: ALFRESCO SOFTWARE, INC., San Mateo, CA (US)

(72) Inventors: Paul Holmes-Higgin, Guildford (GB); Frederik Heremans, Maidenhead (GB); Tijs Rademakers, Maidenhead (GB); Joram Barrez, Brussels (BE)

(73) Assignee: HYLAND UK OPERATIONS LIMITED, Maidenhead (GB)

( * ) Notice: Subject to any disclaimer, the term of this patent is extended or adjusted under 35 U.S.C. 154(b) by 589 days.

(21) Appl. No.: 15/614,506

(22) Filed: Jun. 5, 2017

(65) Prior Publication Data

US 2017/0337255 A1 Nov. 23, 2017

Related U.S. Application Data

(63) Continuation of application No. 14/170,323, filed on Jan. 31, 2014, now Pat. No. 9,672,261.
(Continued)

(51) Int. Cl.
*G06F 16/27* (2019.01)
*G06F 16/178* (2019.01)
(Continued)

(52) U.S. Cl.
CPC .............. *G06F 16/27* (2019.01); *G06F 8/61* (2013.01); *G06F 16/178* (2019.01);
(Continued)

(58) Field of Classification Search
CPC ...... G06F 16/178; G06F 16/27; G06F 16/275; G06F 8/61; H04L 63/02; H04L 63/10; H04L 67/1095
(Continued)

(56) References Cited

U.S. PATENT DOCUMENTS

7,949,711 B2 * 5/2011 Chang ................. H04L 67/2823
  709/205
8,892,679 B1 * 11/2014 Destagnol ............. H04L 65/403
  709/213
(Continued)

*Primary Examiner* — Mark E Hershley
(74) *Attorney, Agent, or Firm* — Mintz Levin Cohn Ferris Glovsky and Popeo, P.C.; F. Jason Far-hadian, Esq.

(57) ABSTRACT

A workflow executed by an on-premise installation of the content management system can include a cloud workflow and an on-premise workflow relating to on-premise content retained in an on-premise repository managed by the on-premise installation of the content management system. A synchronization can be initiated between the on-premise content and a cloud copy of the on-premise content to reflect a change to either of the on-premise content or the cloud copy in the other of the on-premise content and the cloud copy. The cloud copy can exist at a location managed by a cloud-based installation of the content management system. Upon detection that the cloud workflow has been completed by the location using the cloud copy, a resumption of the on-premise workflow can be triggered using the synchronization between the on-premise content and the cloud copy of the on-premise content. Related systems, methods, products, etc. are described.

20 Claims, 5 Drawing Sheets

Related U.S. Application Data (60) Provisional application No. 61/887,277, filed on Oct. 4, 2013.

(51) Int. Cl.
*G06F 8/61* (2018.01)
*H04L 29/06* (2006.01)
*H04L 29/08* (2006.01)
*H04L 67/1095* (2022.01)

(52) U.S. Cl.
CPC ............ *G06F 16/275* (2019.01); *H04L 63/02* (2013.01); *H04L 63/10* (2013.01); *H04L 67/1095* (2013.01)

(58) Field of Classification Search
USPC .................................................. 707/610, 611
See application file for complete search history.

(56) References Cited

U.S. PATENT DOCUMENTS

| | | | | |
|---|---|---|---|---|
| 9,213,718 B1* | 12/2015 | Hrebicek | ............... | G06F 16/178 |
| 9,349,123 B1* | 5/2016 | McNamara | ........ | G06Q 30/0643 |
| 9,465,856 B2* | 10/2016 | Branton | ................ | G06F 16/275 |
| 9,652,741 B2* | 5/2017 | Goldberg | ............ | G06Q 10/101 |
| 9,811,532 B2* | 11/2017 | Parkison | ............ | G06F 16/137 |
| 9,811,662 B2* | 11/2017 | Sharpe | ................ | G06F 16/183 |
| 10,503,822 B1* | 12/2019 | Spencer | ................ | G06F 40/197 |
| 2002/0065879 A1* | 5/2002 | Ambrose | ................ | H04L 63/02 |
| | | | | 709/203 |
| 2003/0137536 A1* | 7/2003 | Hugh | ................... | G06F 16/273 |
| | | | | 715/744 |
| 2003/0227487 A1* | 12/2003 | Hugh | ................ | G06F 16/9024 |
| 2005/0038687 A1* | 2/2005 | Galdes | ................ | G06Q 10/107 |
| | | | | 709/206 |
| 2009/0172101 A1* | 7/2009 | Arthursson | ............. | G06F 9/452 |
| | | | | 709/205 |
| 2010/0153482 A1* | 6/2010 | Kim | ................... | G06F 8/61 |
| | | | | 709/201 |
| 2011/0066668 A1* | 3/2011 | Guarraci | ................ | G06F 16/27 |
| | | | | 707/831 |
| 2011/0110568 A1* | 5/2011 | Vesper | ................... | G06Q 10/10 |
| | | | | 382/128 |
| 2011/0137991 A1* | 6/2011 | Russell | ................... | G06Q 10/06 |
| | | | | 709/204 |
| 2012/0131656 A1* | 5/2012 | Slaton | ................ | G06Q 40/025 |
| | | | | 726/6 |
| 2012/0148115 A1 | 6/2012 | Birdwell et al. | | |
| 2012/0166516 A1* | 6/2012 | Simmons | ............ | G06F 16/188 |
| | | | | 709/202 |
| 2012/0190386 A1* | 7/2012 | Anderson | ................ | G01S 19/14 |
| | | | | 455/456.3 |
| 2012/0203908 A1* | 8/2012 | Beaty | ................... | G06F 9/5072 |
| | | | | 709/226 |
| 2012/0204169 A1* | 8/2012 | Breiter | ................ | G06F 9/44526 |
| | | | | 717/171 |
| 2012/0204187 A1* | 8/2012 | Breiter | ................ | G06F 9/5072 |
| | | | | 718/105 |
| 2012/0209947 A1* | 8/2012 | Glaser | ................ | G06F 9/5027 |
| | | | | 709/217 |
| 2012/0278439 A1* | 11/2012 | Ahiska | ................ | A63F 13/358 |
| | | | | 709/218 |
| 2013/0013560 A1* | 1/2013 | Goldberg | ............ | G06Q 10/101 |
| | | | | 707/634 |
| 2013/0031155 A1* | 1/2013 | Terrano | ................... | H04L 67/06 |
| | | | | 709/201 |
| 2013/0097687 A1 | 4/2013 | Storm | | |
| 2013/0103911 A1* | 4/2013 | Bulut | ................ | G06F 12/0866 |
| | | | | 711/144 |
| 2013/0111336 A1* | 5/2013 | Dorman | ................ | G06F 9/4843 |
| | | | | 715/255 |
| 2013/0124638 A1* | 5/2013 | Barreto | ................... | G06F 15/16 |
| | | | | 709/205 |
| 2013/0179947 A1* | 7/2013 | Kline, III | ............ | H04L 63/0823 |
| | | | | 726/4 |
| 2013/0212067 A1* | 8/2013 | Piasecki | ................ | G06F 16/1787 |
| | | | | 707/620 |
| 2013/0212200 A1* | 8/2013 | Dennis | ................... | H04L 51/22 |
| | | | | 709/206 |
| 2013/0226876 A1* | 8/2013 | Gati | ...................... | G06F 16/119 |
| | | | | 707/652 |
| 2013/0238564 A1* | 9/2013 | Tucker | ................ | G06F 11/2094 |
| | | | | 707/656 |
| 2013/0268357 A1* | 10/2013 | Heath | ................... | G06Q 30/02 |
| | | | | 705/14.53 |
| 2013/0297700 A1* | 11/2013 | Hayton | ................ | G06Q 10/10 |
| | | | | 709/204 |
| 2013/0298061 A1* | 11/2013 | Bimson | ................ | G06F 3/0482 |
| | | | | 715/771 |
| 2013/0325622 A1* | 12/2013 | Kamitani | ............ | G06Q 30/0267 |
| | | | | 705/14.64 |
| 2014/0006350 A1* | 1/2014 | Fukui | ................... | G06F 16/178 |
| | | | | 707/632 |
| 2014/0006465 A1* | 1/2014 | Davis | ................ | G06F 16/183 |
| | | | | 707/827 |
| 2014/0007239 A1* | 1/2014 | Sharpe | ................ | G06F 16/137 |
| | | | | 726/24 |
| 2014/0019497 A1* | 1/2014 | Cidon | ................... | G06F 16/182 |
| | | | | 707/827 |
| 2014/0026182 A1* | 1/2014 | Pearl | ...................... | G06F 21/554 |
| | | | | 726/1 |
| 2014/0052825 A1* | 2/2014 | Luecke | ................ | H04L 67/1097 |
| | | | | 709/219 |
| 2014/0059002 A1* | 2/2014 | Lockhart | ............ | G06F 16/178 |
| | | | | 707/622 |
| 2014/0068254 A1* | 3/2014 | Scharf | ................ | G06F 21/6218 |
| | | | | 713/165 |
| 2014/0068588 A1* | 3/2014 | Tan | ........................ | G06F 8/656 |
| | | | | 717/169 |
| 2014/0074788 A1* | 3/2014 | Chatterjee | ............... | H04L 47/70 |
| | | | | 707/639 |
| 2014/0075518 A1* | 3/2014 | D'Souza | ................ | H04L 9/14 |
| | | | | 726/4 |
| 2014/0115329 A1* | 4/2014 | Sturonas | ............ | G06F 21/6218 |
| | | | | 713/165 |
| 2014/0136635 A1* | 5/2014 | Jeng | ........................ | H04L 51/22 |
| | | | | 709/206 |
| 2014/0149794 A1* | 5/2014 | Shetty | ................ | H04L 67/1095 |
| | | | | 714/20 |
| 2014/0164315 A1* | 6/2014 | Golshan | ................ | G06F 16/93 |
| | | | | 707/608 |
| 2014/0223507 A1* | 8/2014 | Xu | ........................ | H04L 67/10 |
| | | | | 726/1 |
| 2014/0279873 A1* | 9/2014 | Somerfield | ........... | G06F 16/172 |
| | | | | 707/610 |
| 2014/0281875 A1* | 9/2014 | Branton | ................ | G06F 40/169 |
| | | | | 715/230 |
| 2014/0282525 A1* | 9/2014 | Sapuram | ................ | G06Q 40/00 |
| | | | | 718/1 |
| 2014/0325622 A1 | 10/2014 | Luk et al. | | |
| 2014/0379648 A1* | 12/2014 | Chiu | ...................... | G06F 16/178 |
| | | | | 707/624 |
| 2015/0012488 A1* | 1/2015 | van Rossum | ....... | G06F 16/1767 |
| | | | | 707/611 |
| 2015/0012565 A1* | 1/2015 | Engberg | ................ | G06F 16/258 |
| | | | | 707/783 |
| 2015/0100547 A1* | 4/2015 | Holmes-Higgin | ......................... H04L 67/1095 | |
| | | | | 707/610 |
| 2015/0100548 A1* | 4/2015 | Mc Erlean | ............... | H04L 63/02 |
| | | | | 707/610 |
| 2015/0101021 A1* | 4/2015 | Mc Erlean | ............... | H04L 63/10 |
| | | | | 726/4 |
| 2016/0234189 A1* | 8/2016 | Storm | ................... | G06F 16/176 |

* cited by examiner

HYBRID WORKFLOW SYNCHRONIZATION BETWEEN CLOUD AND ON-PREMISE SYSTEMS IN A CONTENT MANAGEMENT SYSTEM

CROSS-REFERENCE TO RELATED APPLICATION

The current application is a Continuation application of U.S. Non-Provisional application Ser. No. 14/170,323 filed on Jan. 31, 2014, which claims priority under 35 U.S.C. § 119(e) to U.S. Provisional Patent Application No. 61/887,277 filed on Oct. 4, 2013, the disclosure of which is incorporated herein by reference.

TECHNICAL FIELD

The subject matter described herein relates generally to content management systems.

BACKGROUND

Enterprise Content Management (ECM) relates to systems and methods to generate, store, manage and share content related to organizational processes of an enterprise. The content can be embodied in a paper document, an electronic file, a database, a message exchange or an email, among others. In modern ECM systems, the content is typically stored and managed as electronic, digital data on a single platform.

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein generically as "files") that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. Content managed by a CMS can include one or more of documents, images, photos, Web pages, records, XML documents, other unstructured or semi-structured files, etc. An "enterprise" can generally refer to an organization, such as for example a business, a foundation, a university, or the like, and can have content requirements related to one or more business processes, content uses, etc.

A CMS manages the actual digital binary content, metadata or other record that describes a context or content object of each content item, associations between a content item and other content or content items, a place and classification of a content item in a repository, indexes for finding and accessing content items, etc. The CMS can manage processes and lifecycles of content items to ensure that this information is correct. The CMS can also manage one or more workflows for capturing, storing, and distributing content, as well as the lifecycle for how long content will be retained and what happens after that retention period.

Conventional ECM and CMS platforms deliver collaboration and control in an organization by managing workflows of millions of documents, complex processes and potentially thousands of users, but are suited for "on-premise" workflows, i.e. on the organization's network within a firewall. Today however, new mobile computing devices, remote working styles and an expanding network of external contractors, agencies and suppliers, which are considered part of a distributed computing architecture called "the cloud," create new issues and challenges for ECM system in managing collaboration between on-premise and cloud workflows. For instance, content cannot be pushed from the cloud to an on-premise workflow through a firewall, only pulled from the cloud by the on-premise system. Further, using conventional polling mechanisms between an on-premise workflow and a cloud workflow risks potential timing issues. These and other issues present serious challenges for effective collaboration and control and process automation.

SUMMARY

As discussed in greater detail below, features of the current subject matter can enable synchronization between on-premise workflow and a cloud workflow, including synchronization of both content and metadata.

In one aspect, a method includes the step of executing a workflow by one or more processors associated with an on-premise installation of a content management system. The workflow includes a cloud workflow and an on-premise workflow relating to on-premise content retained in an on-premise repository managed by the on-premise installation of the content management system. The method further includes the step of determining, by the one or more processors, a destination for a cloud copy of the on-premise content. The destination includes a location, such as a tenant, site or folder, managed by a cloud-based installation of the content management system, and where the on-premise installation of the content management system is protected from access by external users by a firewall, and the location is outside of the firewall. The method further includes the step of initiating, by the one or more processors, a synchronization between the on-premise content and the cloud copy of the on-premise content. The synchronization includes reflecting a change to either of the on-premise content or the cloud copy in the other of the on-premise content and the cloud copy, where the change includes a content change and a metadata change.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As referred to herein, a CMS generally includes at least one programmable processor executing some form of machine-readable instructions (e.g. software code, etc.) to provide one or more content management functions. The term firewall is generally used throughout this disclosure to refer to network security controls, features, functionality, etc. that restrict access to users outside of the firewall to content retained on one or more repositories inside of that firewall.

Various implementations of the current subject matter can, among other possible benefits and advantages, provide a method for partitioning, distributing and isolating workflow components of a distributed (i.e. multi-party) workflow, some of which exists across a firewall, while maintaining content and metadata synchronization. A workflow is a sequence of connected tasks applied to a document or other item of content. Each task can be performed by a person, a group, or automatically by a part of an on-premise or cloud-based CMS. A workflow is defined by a workflow model and definition, which can be pushed to a cloud-based installation of a CMS, such as a multi-tenant system and repository. A "hybrid workflow" includes a cloud workflow and an on-premise workflow relating to on-premise content retained in an on-premise repository managed by the on-premise installation of the CMS.

Services and controls for managing content of a CMS consistent with implementations of the current subject matter can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

In addition to supporting features typical of a cloud-based or "software as a service (SaaS) software delivery model, a synchronization scheme consistent with the descriptions provided here can provide a number of desirable features. For example, the current subject matter can support automatic synchronization of content between one or more CMS-managed repositories that are inside of a firewall and a copy of one or more content items that are made accessible to authorized collaborating users of location, such as a defined collaboration site, in the cloud. Such features can enhance ease of engagement and collaboration both between users within an organization and other collaborating users who are external to the organization.

Figure 1:
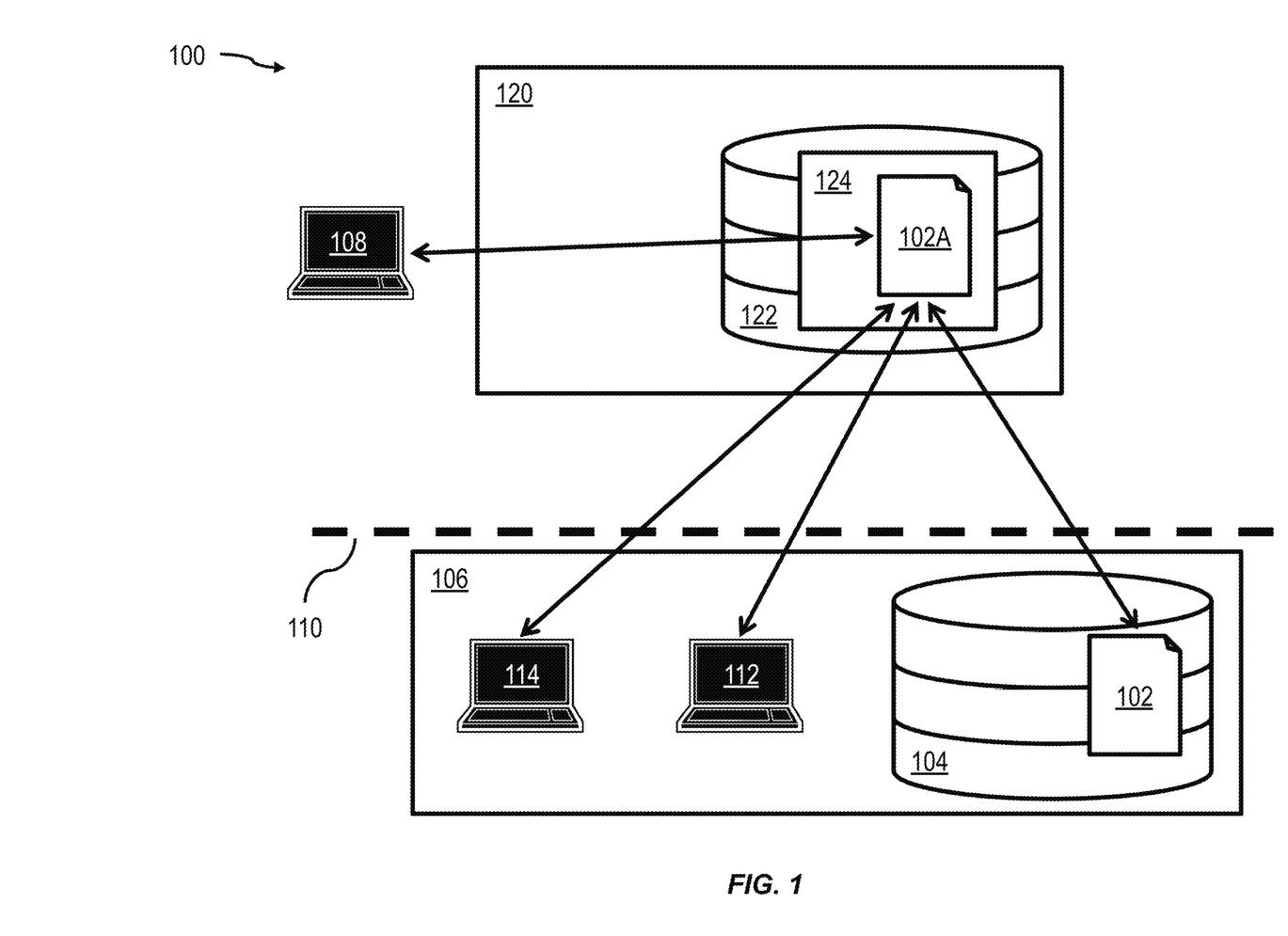
FIG. 1 shows a diagram illustrating features of a CMS architecture consistent with implementations of the current subject matter.

As described in greater detail below, synchronization can be supported for individual and multiple files, folders, and folder hierarchies between the "on-premise" and "cloud" repositories. As an illustrative example, FIG. 1 shows a diagram of a synchronization architecture 100 in which on-premise content 102 stored in a repository 104 of an on-premise installation 106 of a CMS is restricted from being accessed by an external user 108 who is outside of a firewall 110. A first internal user 112 who is inside the firewall 110 has access permissions (which can include one or more of ownership, authorship, read/write permission, etc.) to the on-premise content 102. A second internal user 114 who is inside the firewall 110 can optionally be restricted from accessing the on-premise content 102, for example due to a differing role or permission set of the second internal user 114. Also as shown in FIG. 1, a cloud-based installation 120 of the CMS can include tenant-isolated access to a cloud-based repository 122. As used herein, the term "on-premise content" refers generally to content retained in the on-premise repository 104 and available for synchronization with a tenant 124. The on-premise content 102 can include a single content file or multiple content files. Alternatively or in addition, the on-premise content 102 can be synchronized at a higher directory level, such as for example by linking one or more folders, file trees, other directory structures, etc. such that a linked folder, file tree, other directory structure, etc. as well as any other content items included within the linked folder, file tree, other directory structure, etc. are replicated in the tenant as the cloud copy 102A. For a synchronized multi-level directory structure, file tree, set of folders, etc., any sub-directories, branches of the file tree, sub-folders, etc. are also replicated to the cloud copy 102A and synchronized.

Figure 2:
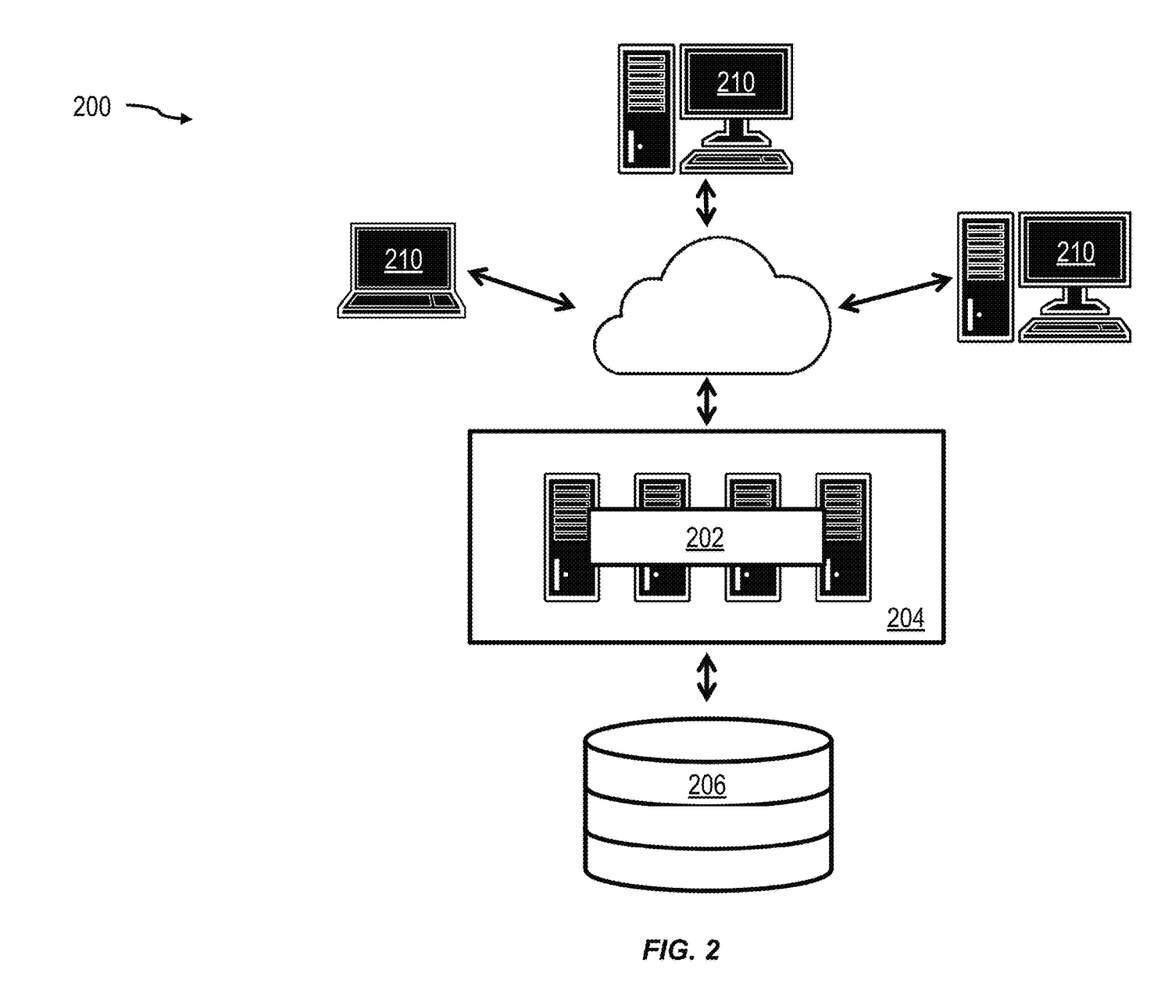
FIG. 2 shows a diagram illustrating features of multi-tenancy software installations that may relate to one or more implementations of the current subject matter.

Tenant-isolated access refers to a multi-tenancy arrangement in which an installation of a software application 202 runs on a server (or multiple servers) to support multiple client-organizations (tenants). Multi-tenancy differs from multi-instance architectures where separate software instances (or hardware systems) operate on behalf of different client organizations. FIG. 2 shows a diagram 200 illustrating a basic multi-tenant arrangement. In a multi-tenant architecture, the software application 202 running on the one or more servers 204 virtually partitions its data and configuration within one or more data storage systems 206 accessible by the one or more servers 204. The one or more data storage systems 206 can include one or more hard drives, flash memory, RAM, optical storage, or any other kind of information storing device. Each of multiple client organizations can optionally work with a customized virtual application instance supported by one of multiple tenants 210. Data in the one or more repositories 206 that are specific to a given tenant of the multiple tenants 210 are accessible only to authorized users of that tenant. Given this definition of a multi-tenancy arrangement, it will be readily understood that references herein to a cloud-based repository 122 are intended to refer broadly to data accessible to and isolated within a tenant of a multi-tenant implementation of a software as a service offering of a software application 202, which in this example is a content management system.

Referring again to FIG. 1, the first internal user 112 can create a linkage between the on-premise content 102 in the repository 104 of the on-premise installation 106 of the CMS and a cloud copy 102A of the on-premise content 102. The cloud copy 102A can exist in the cloud-based repository 122 and be isolated to provide access only to authorized users of a specific tenant 124 of which the first internal user 112 is an authorized user. The cloud copy 102A can include both the content of the on-premise content 102 as well as a synchronized set of common metadata. The synchronized set of metadata are synchronized between the cloud copy 102A and the on-premise content 102 in the repository 104 of the on-premise installation 106 as discussed in greater detail below.

This synchronization can occur automatically. Communications necessary to ensure synchronization of changes to the synchronized set of metadata and/or to the content of the on-premise content 102 or the cloud copy 102A of the content are initiated from the on-premise installation 106 of the CMS. In other words, changes made to the content item (e.g., changes in content or metadata relating to the on-premise content 102) from inside the firewall 110 are pushed to the tenant 124 to be reflected in the cloud copy 102A while changes to the cloud copy 102A occurring within the tenant 124 are pulled to the on-premise installation 106 of the CMS to be reflected in the on-premise content 102. Exchange of the synchronization information can occur over secure communication channels, such as for example HTTPS connections or the like. Because initiation of all communication actions necessary to synchronize changes made to either of the cloud copy 102A or the on-premise content 102 occur from the on-premise installation 106, opening of the firewall 106 is unnecessary. The first internal user (and optionally other users of the on-premise installation 106 with administrator or ownership rights to the content item) can determine one or more parameters that dictate what information can be synchronized (e.g. to ensure the sensitive content remains on-premise), how conflicting changes to one or the other of the cloud copy 102A and the on-premise content 102 are resolved, etc.

Consistent with some implementations of the current subject matter, a synchronization process can include establishing authentication between the tenant 124 and the on-premise installation 106. In some examples, authentication can be established through interaction of the first internal user 112 with one or more user interface elements, such as for example a window, navigation pane, or other display feature including one or more user interface elements, an inline prompt, etc. The first internal user 112 can be requested to supply authentication credentials on a first request to set up a synchronization between a content item held within the firewall-protected installation of the content management system, and the authentication credentials can be saved, for example in a secure credentials store or the like for future synchronization actions. Optionally, the authentication credentials can be checked for accuracy when they are entered to prevent, for example, an incorrect password, username, or other credentials, from being saved in the secure credentials store. In some examples, an oAuth implementation or the like can be used to establish authentication of the first internal user 112.

The first internal user 112 can be allowed to synchronize the on-premise content 102 between the firewall-protected on-premise installation 106 and at least one tenant 124 to which the first internal user 112 has authorized access. The tenant 124 can have multiple users connecting to it at the same time to allow collaboration. One or more of the multiple users can be an external user 108 or a second internal user 114 within the on-premise installation 106. The first internal user 112 can optionally be limited to storing the credentials for only a tenant 124.

As a further explanation, any given internal user (e.g. the first internal user 112) can have two user identifications, one for the tenant 124 and one for the on-premise installation 106. Multiple internal users can have permissions to access, edit, etc. the on-premise content 102 via the on-premise installation. Similarly, one or more internal users 112, 114 as well as one or more external users 108 who have or are given access to the tenant 124 can access the cloud copy 102A of the content item. The first internal user 112 can be capable of synchronizing the on-premise content 102 with any tenant (e.g. cloud based instance of the CMS) to which the first internal user 112 has authorized access to create and update content.

Consistent with some implementations, the first internal user 112 (e.g. the user creating a synchronized link for content 102 to the cloud) can be granted permissions for access to sites or folders within a tenant 124 at a finer level of granularity than per tenant. For example, a tenant 124 can include one or more "sites" as well as folders or other directory structures that can exist within separate sites in the tenant 124. Permissions can be defined at a site level and at a folder or subfolder level. The first internal user 112 can, for example, be able to select a first folder (e.g. "Folder A") as a target for synchronizing but not a second folder (e.g. "Folder B"), even if both Folder A and Folder B are inside the same site in the same tenant 124.

Similarly, while the tenant 124 can contain many sites, the first internal user 112 may only be able to see a subset of those sites, and may be able to create and update content in an even smaller subset of those sites. Implementations of the current subject matter can support access controls such as these or other comparable scenarios, and in general can allow an on-premise user to sync content only to a location in the cloud (tenant+site+folder) to which they have create and edit permissions.

Once authentication between the tenant 124 and the on-premise installation 106 is established, the first internal user can select one or more content items 102 to be linked between the on-premise installation 106 and the tenant 124. In one example consistent with implementations of the current subject matter, this selection can be accomplished through an on-premise document library, which generally refers to a user interface view of a file directory structure that enables user navigation through content items accessible within the repository 104 of the on-premise installation 106. The first internal user 112 can select one or more folders or files (e.g. content items—the term files is also herein interchangeably with content items) to synchronize through interactions with document library functionality.

Synchronization between on-premise content 102 and a cloud copy 102A of that content can be based on a concept of synchronization sets ("synch-sets"), which generally include a group of one or more files, folders, etc. that sync to a particular location in the cloud installation 120. As used herein, a location refers to any of a tenant, a site, a folder, a directory tree, a document, etc. If the first internal user 112 selects multiple files for linking between the on-premise installation 106 and the tenant 124, these multiple files can be grouped together as a single synch-set. If the first internal user 112 selects only one file, a synch-set containing a single node will be created. The term node is used herein to refer to a file, a folder, or other content items as it is represented in a repository (either the on-premise repository 104 or the cloud repository 122). A user that creates a synch-set (e.g., the first internal user 112 in the example described here) owns that synch-set, which uses that user's cloud credentials to synchronize the files included in the synch-set between the on-premise repository 104 and the cloud-based repository 122. Linkages between content in the on-premise repository 104 and the tenant can be established for individual files or for folders or other file directory structures that can contain multiple individual files and/or subfolders.

As noted above, synchronization of changes occurring to either of a cloud copy 102A or the on-premise content 102 itself occurs via a push/pull process that is initiated from the on-premise installation 106. Pushing and pulling of changes can be accomplished on a synch-set by synch-set basis. In some examples, synchronization management can be accomplished on an individual file basis while the synch-sets are managed by the system. As an example of this approach, a user can request a synchronization of a file or other content item located within a larger file structure (e.g. a folder, directory tree, etc.) individually. Synchronization of the larger file structure (e.g. to synchronize all changes to all content items within it) can occur under automatic control. Alternatively or in addition, the selected content item or items can be individually synchronized between the on-premise and cloud repositories. In other implementations, administrator and/or user level synch-set management features can be made available. Synchronization management actions (such as for example un-synchronizing a cloud copy 102A and on-premise content 102 in the on-premise repository 104) are generally required to be performed at the same file directory level included by the first internal user 112 within the original linkage. For example, if the first internal user 112 links a folder (e.g. a file directory structure that can contain one or more files or sub-folders) as part of a synch-set, un-synchronizing of content within the folder occurs atomically for all the contents of the folder rather than on an item or sub-folder basis for content or subfolders within the folder.

Figure 3:
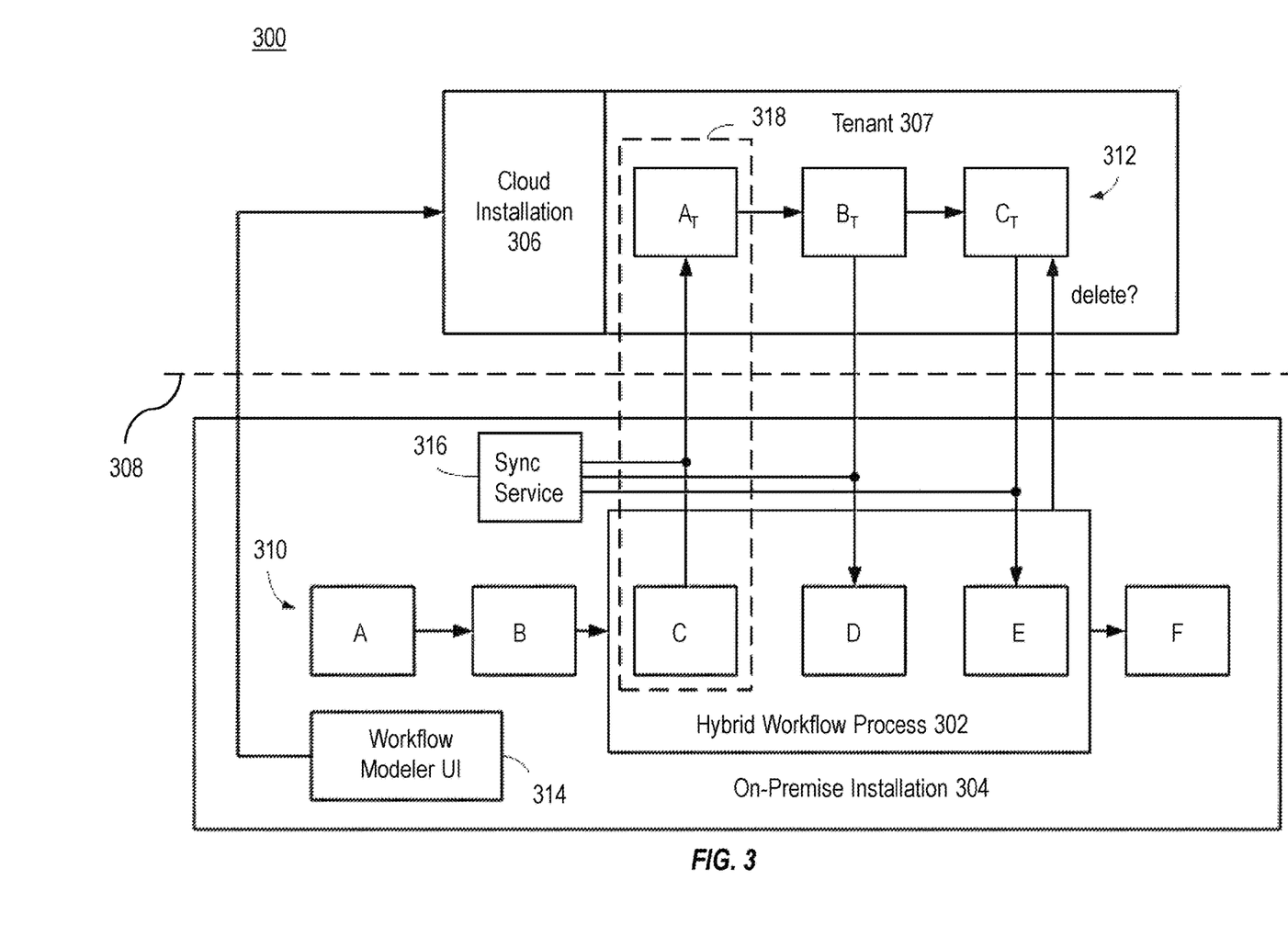
FIG. 3 shows a diagram illustrating features of a hybrid workflow that synchronizes an on-premise workflow with a cloud workflow.

Synchronization management features can include associated a marker aspect with on-premise content 102 when the on-premise content is added to a synchronization set. When unsynchronization occurs, the marker aspect associated with the on-premise content 102 is removed and an unsynchronization record can be added to the on-premise audit log. Deletion of the on-premise content 102 from the on-premise repository 104 can also result in the unsynchronization record being added to the on-premise audit log 302. When the CMS on-premise installation 106 queries the on-premise audit log for changes, it finds the on-premise content unsynchronization record and pushes it to the tenant 124 just as any other change. The cloud copy 102A can optionally be deleted upon receipt at the tenant 124 of the unsynchronization record. Alternatively, the cloud copy 102A can be retained at the tenant. However, further changes to the cloud copy 102A are not pulled back to the on-premise content node 102, as the synchronization link has been removed, or in some cases the on-premise content 102 has been deleted.

In some examples, on-premise content 102 that is synchronized with a cloud copy 102A at the tenant 124 can be locked such that only changes to the cloud copy 102A are allowed. In other words, while the on-premise content node 102 is synchronized with the cloud copy 102A, the on-premise node 102 is available only for read access. This approach can assist in maintaining consistency in versions of the content 102. Both external users 108 and first and second internal users 112 and 114 (as well as other internal and external users) can collaborate using a collaboration site established in the tenant 124. The on-premise installation 106 of the CMS can thereby serve as the system of record for changes to the content 102 while the tenant 124 serves as a system of engagement where collaborative changes to the cloud copy 102A of the content occur. The changes to the cloud copy 102A are periodically pulled back to the on-premise installation for recording and versioning. The cloud copy 102A can hold the most up-to-date version of the content. The on-premise content 102 can "lag behind" the cloud copy 102A, so after a change is made in the cloud repository 122 there exists a short period of time during which the on-premise content 102 does not reflect the latest version in the tenant 124.

Multiple on-premise repositories can synchronize content independently of one another to multiple tenants in the cloud. It is also possible for multiple distinct on-premise repositories to synchronize content into different locations in a single tenant 124. Accordingly, consistent with illustrative implementations of the current subject matter, pull synchronization can involve communications between the on-premise installation 106 and the tenant 124 at two levels of granularity. For communication efficiency and data security reasons, an on-premise repository 104 can make periodic requests to the tenant 124 for a high-level "manifest" of relevant changes made to items stored in the cloud-based installation 120. This manifest can include a coarse-grained definition of any content item changes that are relevant for that particular on-premise repository 104 but need not include any information on changes that are relevant to other on-premise repositories besides the on-premise repository 104. For example, the coarse-grained listing can optionally include identifiers of content items that have changed, and/or identifiers of synchronization sets containing content items that have changed without including specifics about the changes themselves. The specifics can be requested to be sent in a second communication using the identifiers provided in the manifest. Examples of irrelevant changes can include, but are not limited to, changes to content items synchronized with other on-premise repositories. The server or servers hosting the multi-tenant, cloud-based instance of the CMS can support this functionality, for example through storage in tenant audit logs 312 of a source repository identifier for each change and through audit log queries which can be filtered by the source repository identifier. For example, the source repository identifier, which identifies a on-premise repository 104 to which a copy 102A in the cloud repository 122 is linked, can be provided when the synch-set is initially created in the tenant, site, folder, etc. in the cloud and never changes.

Consistent with some implementations of the current subject matter, a workflow can be synchronized between an on-premise ECM and a cloud ECM, by the partitioning, distribution and isolation of workflow components among an on-premise workflow and a cloud workflow. Content and metadata associated with the content that are processed in the on-premise workflow are synchronized with a cloud copy of the content and metadata that are processed in the cloud workflow, leveraging a cloud synchronization mechanism, as described in further detail below.

Another advantage consistent with some implementations of the current subject matter is that both document content and potential workflow actions are always atomic. For example, when a document is updated in the cloud and the cloud-based workflow is finished, the on-premise version of the document will be synchronized before the on-premise workflow will continue 'flowing' or otherwise be resumed, such that the latest version is always available to users either in the on-premise workflow or cloud workflow.

FIG. 3 illustrates a hybrid workflow process 302 in a content management system 300. The content management system 300 includes an on-premise installation 304 and a cloud installation 306 of the content management system. The on-premise installation 304 is protected by a firewall 308, and which protects the on-premise installation during data transmission with the cloud-based installation 306 and any other external networks that are outside the protections of the firewall 308. The on-premise installation 304 further includes an on-premise repository that stores on-premise content, which includes both content and metadata associated with the content, and which can be stored as a document, a file, or other form of data.

The cloud installation 306 can include one or more tenants 307, and each tenant can include one or more tenant computing systems or virtual machines, which can be organized in a multi-tenancy cloud-based architecture. Each tenant 307 can include a computer connected with a network. The cloud-based installation 306 can also include a cloud-based repository that stores cloud-based content and metadata, as well as cloud copies of on-premise content and metadata.

Both the on-premise installation 304 and the cloud installation 306 of the content management system 300 can include any number of user computers that receive user input, and by which a user can perform actions on one or more documents or other files as a part of the workflow that is defined at the on-premise installation 304. At least one user computer at the on-premise installation 304 can include a workflow modeler and user interface 314 to model the workflow and define the steps of the workflow. The modeler and user interface 314 receives input for selecting a destination and network of the files in the cloud workflow 312, and accordingly, input for selecting one or more assignee(s) in the tenant of the selected network for the cloud workflow 312.

The on-premise installation 304 executes an on-premise workflow 310 (workflow states A, B, C, D, E, and F) of the workflow, while the cloud installation 306 executes a cloud workflow 312 (workflow states $A_T$, $B_T$, and $C_T$) of the workflow. Each workflow state in the on-premise workflow 310 and cloud workflow 312 represents an action, such as "review," "approve," or "complete," for example, in the workflow. According to a workflow defined at the on-premise installation 304, a designated user/tenant of the cloud installation 306 can open a task, review a document(s), and approve or reject the task or make other changes to the document(s).

A portion of the on-premise workflow 310 can include the hybrid workflow process 302. A communication channel implemented by a synchronization service 316 synchronizes the on-premise workflow 310 and the cloud workflow 312 in the hybrid workflow process 302. The synchronization service 316 sets up a number of synch-sets 318 to synchronize service tasks, actions and changes to designated content. Each synch-set 318 defines a workflow pair having an on-premise workflow state, an associated cloud workflow state, and the communication channel between them. Via the synch-sets 318, service tasks, actions and changes are pushed from the on-premise installation 304 to the cloud installation 306, and pulled from the cloud installation 306 by the on-premise installation 304 through firewall 308. When the workflow is defined, an aspect is added as a set of properties to documents, files and/or other content that are designated as part of a hybrid workflow. As used herein, "aspect" refers to a piece of metadata that is part of the metadata definition for each of the documents, files and/or other content. The aspect identifies the documents, files or other content (and associated metadata) that are part of the hybrid workflow, and facilitates retrieval by a workflow manager computer (not shown in FIG. 3) of the on-premise workflow associated with the identified content. Further, the aspect allows state to be shared between the on-premise workflow and the cloud workflow via the cloud sync mechanism, including a state that represents when a task or step is completed.

Figure 4:
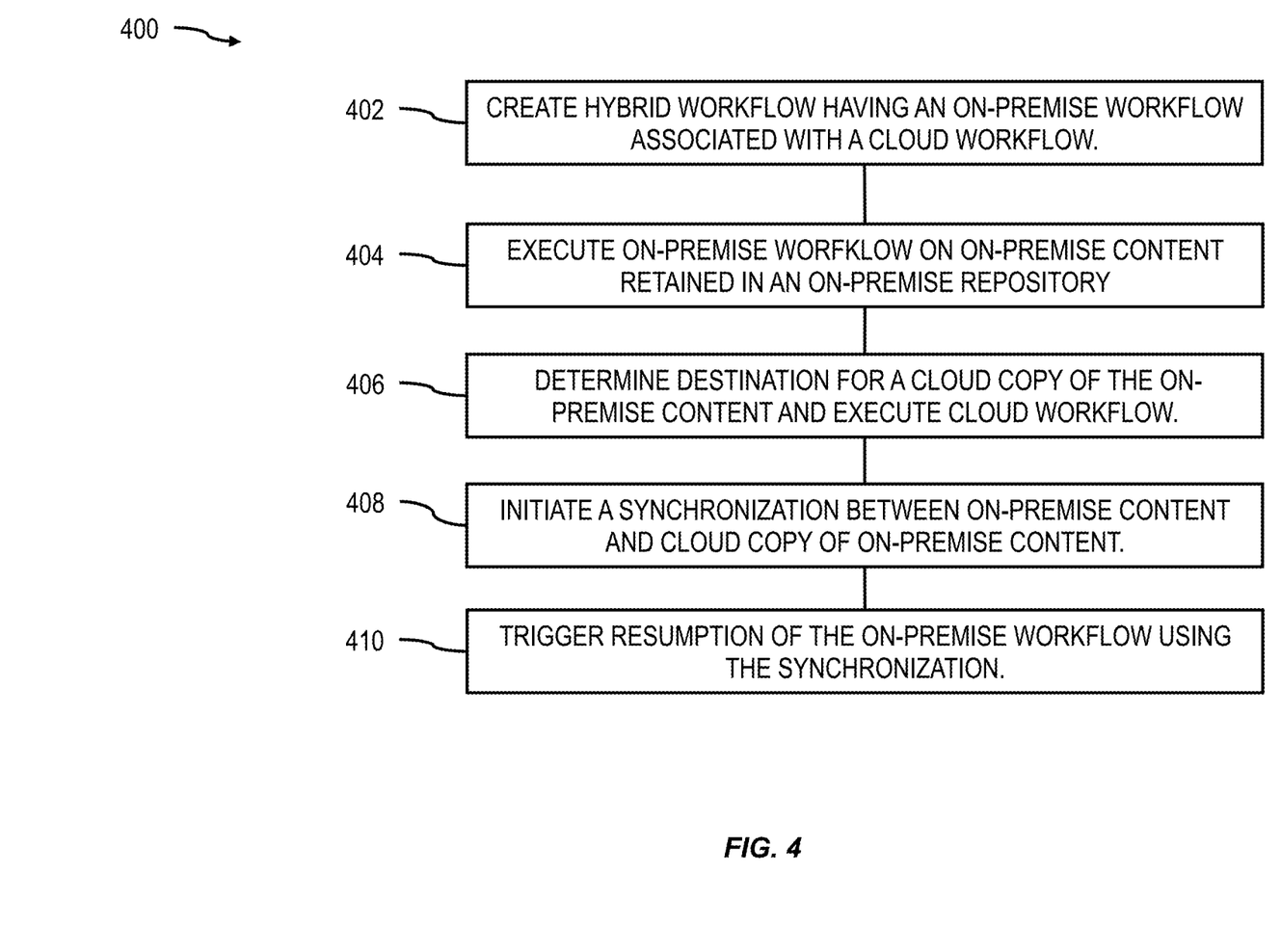
FIG. 4 shows a process flow diagram illustrating aspects of a method having one or more features consistent with implementations of the current subject matter.

FIG. 4 shows a process flow chart 400 illustrating features that can be included in a method consistent with implementations of the current subject matter. At 402, a hybrid workflow is created in an on-premise installation of a content management system. The workflow includes a cloud workflow and an on-premise workflow relating to on-premise content retained in an on-premise repository managed by the on-premise installation of the content management system. At 404, the workflow is executed by the on-premise installation of the content management system.

At 406, a destination is determined for a cloud copy of the on-premise content. The destination defines a tenant, site or folder managed by a cloud-based installation of the content management system. The destination is separated from the on-premise installation of the content management system by a firewall of the on-premise installation. A cloud sync mechanism allows synchronization of content and metadata between the on-premise installation and the destination of the cloud installation. At 408, a synchronization is initiated between the on-premise content and the cloud copy of the on-premise content via the cloud sync mechanism. The synchronization includes reflecting a change to either of the on-premise content or the cloud copy in the other of the on-premise content and the cloud copy, and the change includes a content change and/or a metadata change.

At 410, upon detection that the cloud workflow has been completed by the destination using the cloud copy of the on-premise content, a resumption of the on-premise workflow is triggered, based on the synchronization between the on-premise content and the cloud copy of the on-premise content. In other words, changes made to the copy of the on-premise content are synchronized back to the on-premise content, and the on-premise workflow continues based on the synchronized version. At this step, the on-premise workflow is triggered when a synch state definition, which is part of the aspect, is synchronized between the cloud workflow and the on-premise workflow, and the status of completion of the cloud workflow is detected. The on-premise installation receives this decision from the aspect of the document in the cloud installation, looks up the workflow associated with a synchronization state definition (SSD), an aspect that represents the state of synchronization, and generates a signal for the on-premise workflow to resume. This further alerts a user to the new task, with information about the decision in the cloud workflow.

Figure 5:
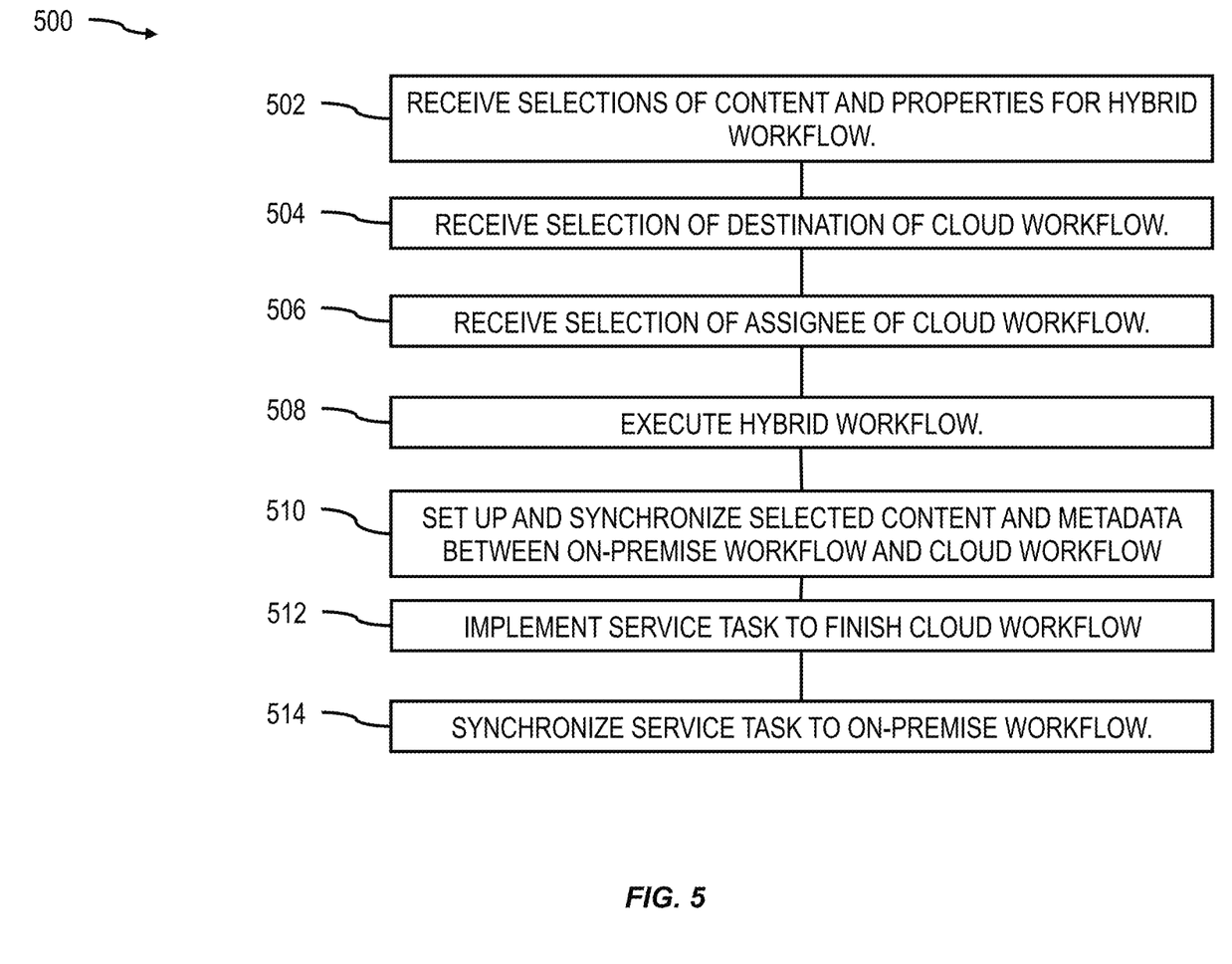
FIG. 5 shows another process flow diagram illustrating aspects of a method having one or more features consistent with implementations of the current subject matter.

FIG. 5 shows another process flow chart 500 illustrating features that can be included in a method consistent with implementations of the current subject matter. At 502, selections of content and properties (i.e., description, due date, priority, etc.) of the content are received at an on-premise installation of a CMS. The files to be included in the workflow are also selected. The workflow includes an on-premise workflow relating to on-premise content retained in an on-premise repository managed by the on-premise installation of the CMS, as well as a cloud workflow in communication with the on-premise workflow by a cloud sync mechanism, yet separated by a firewall around the on-premise installation. At 504, a selection of a destination of the content is received by the on-premise installation. The destination includes a tenant, site or folder of a multi-tenant system managed by a cloud-based installation of the content management system. Accordingly, a user can choose what data is processed where, i.e. in the on-premise workflow or cloud workflow, or both.

At 506, one or more assignees are selected from the cloud installation of the CMS. Each assignee can be selected by an on-premise user after the network, site, and folder are selected. Thereafter, at 508, the hybrid workflow is started with the on-premise workflow on the on-premise installation. At 510, a service task in the workflow sets up the hybrid workflow. The service task includes an aspect, which is added to all documents in the hybrid workflow package. The aspect contains the workflow information and properties (i.e., description, due date, priority, etc.) and a workflow ID for the on-premise workflow. A synch-set is also created for all documents in the hybrid workflow.

The service task is associated with a synchronization service, which synchronizes the selected content and its associated metadata between the on-premise workflow and the cloud workflow. The synchronization service pushes changes to any content and metadata to the cloud installation from the on-premise installation, as content and aspects are created on-premise. Synchronization from the cloud workflow is accomplished by first checking whether a synchronization state definition (SSD) of the document was started in the on-premise workflow. If there is already a cloud workflow running for the on-premise workflow ID associated with a document or other content, the document is added to the cloud workflow package, which can be considered as a synch-set of documents or other content items relevant to the cloud workflow. Generally, contents of a cloud workflow package associated with a SSD are synchronized at the same time as the SSD, thereby advantageously reducing, minimizing, or even eliminating time that the cloud workflow does not contain documents required for its completion. If no cloud workflow is running, a new cloud workflow is started, the properties of the on-premise workflow are pushed to the new cloud workflow, and the document is added to the cloud workflow package. Finally, the SSD is updated, and indicates that the cloud workflow has started.

Once the cloud workflow has started, at 512 a service task is implemented for the cloud user who has been selected as an assignee. The cloud user opens the service task, reviews the document(s), and selects an outcome for the service task, such as, for example, approving or rejecting the document or content item associated with the service task. The decision (approve/reject) is copied to the aspect associated with the document, and the SSD is set to indicate that the cloud workflow is finished.

At 514, the service task of the cloud workflow is synchronized to the on-premise workflow. The SSD is synched to trigger the on-premise workflow, which can occur in a manner similar to the synchronization of content between the on-premise and cloud repositories. The SSD can in some example be considered as another content item that is itself synchronized between the repositories. The outcome from the aspect is stored in the on-premise workflow, by looking up the workflow associated with the SSD and aspect of the document. This signals for the on-premise workflow to resume, and the on-premise user is informed about the outcome made in the cloud installation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A computer program product comprising a non-transitory machine-readable medium storing instructions that, when executed by at least one programmable processor, cause the at least one programmable processor to perform operations of an on-premise installation of a content management system, the operations comprising:

executing at least part of a workflow by the on-premise installation of the content management system, the workflow comprising a cloud workflow and an on-premise workflow relating to on-premise content retained in one or more on-premise repositories managed by the on-premise installation of the content management system;

determining a destination for a cloud copy of the on-premise content stored in a first on-premise repository, the destination comprising a location managed by a cloud-based installation of the content management system, the on-premise installation of the content management system being protected from access by external users by a firewall, and the location being outside of the firewall;

initiating a synchronization between the on-premise content and the cloud copy of the on-premise content from an on-premise installation while maintaining the firewall to ensure sensitive on-premise content is not synchronized, the synchronization comprising:

providing, during a first communication, an identifier associated with a content item that has changed, without providing specifics about nature of the change, as related to the on-premise content or the cloud copy of the on-premise content;

providing, during a second communication, the specifics about the nature of the change;

pushing an indication of corresponding changes to the on-premise content to the cloud-based installation; and pulling an indication of the corresponding changes to the cloud copy of the on-premise content from the cloud-based installation to the on-premise installation.

2. The computer program product in accordance with claim 1, wherein the second communication includes the specifics about the nature of the changes to the content item using the identifier associated with the content item in the first communication and wherein one or more parameters dictate content that can be synchronized.

3. The computer program product in accordance with claim 2, wherein the operations further comprise receiving a selection of content and properties of the on-premise content to be included in the workflow and wherein the one or more parameters indicate how conflicts between on-premise content and the cloud copy of the on-premise content can be resolved.

4. The computer program product in accordance with claim 1, wherein the operations further comprise designating, based on the destination, one or more assignees of a service task to be executed on the cloud copy of the on-premise content, the one or more assignees being associated with the cloud-based installation of the content management system.

5. The computer program product in accordance with claim 4, wherein the service task further designates an outcome that, once completed by the one or more assignees, triggers the resumption of the on-premise workflow.

6. The computer program product in accordance with claim 4, wherein the service task is associated with a synchronization service initiated from the on-premise installation, the synchronization service synchronizing the content change and/or the metadata change between the on premise content and the cloud copy.

7. A computer implemented method comprising:

executing at least part of a workflow by one or more processors associated with an on-premise installation of a content management system, the workflow comprising a cloud workflow and an on-premise workflow relating to on-premise content retained in an on-premise repository managed by the on-premise installation of the content management system;

determining, by the one or more processors, a destination for a cloud copy of the on-premise content, the destination comprising a location managed by a cloud-based installation of the content management system, the on-premise installation of the content management system being protected from access by external users by a firewall, and the location being outside of the firewall; and initiating, by the one or more processors, a synchronization between the on-premise content and the cloud copy of the on-premise content from an on-premise installation while maintaining the firewall to ensure sensitive on-premise information is not synchronized, the synchronization comprising:

providing, during a first communication, an identifier associated with a content item that has changed, without providing specifics about nature of the change, as related to the on-premise content or the cloud copy;

pushing an indication of corresponding changes to the on-premise content to the cloud-based installation; and pulling an indication of the corresponding changes to the cloud copy of the on-premise content from the cloud-based installation to the on-premise installation.

8. The computer-implemented method in accordance with claim 7, further comprising:

triggering, by the one or more processors and upon detection that the cloud workflow has been completed by the location using the cloud copy of the on-premise content, a resumption of the on-premise workflow using the synchronization between the on-premise content and the cloud copy of the on-premise content.

9. The computer-implemented method in accordance with claim 7, further comprising:

adding, by the one or more processors, an aspect to all on-premise content associated with the workflow, the aspect comprising a record that designates the on-premise content for the cloud workflow.

10. The computer-implemented method in accordance with claim 7, further comprising:

designating, by the one or more processors and based on the destination, one or more assignees of a service task to be executed on the cloud copy of the on-premise content, the one or more assignees being associated with the cloud-based installation of the content management system.

11. The computer-implemented method in accordance with claim 10, wherein the service task further designates an outcome that, once completed by the one or more assignees, triggers the resumption of the on-premise workflow.

12. The computer-implemented method in accordance with claim 10, wherein the service task is associated with a synchronization service, the synchronization service synchronizing the content change and/or the metadata change between the on premise content and the cloud copy.

13. The computer-implemented method in accordance with claim 7, further comprising receiving a selection of content and properties of the on-premise content to be included in the workflow.

14. A system comprising:

computer hardware configured to perform operations of a first installation of a content management system, the operations comprising:

executing at least part of a workflow by the on-premise installation of the content management system, the workflow comprising a cloud workflow and an on-premise workflow relating to on-premise content retained in an on-premise repository managed by the on-premise installation of the content management system;

determining a destination for a cloud copy of the on-premise content, the destination comprising a location managed by a cloud-based installation of the content management system, the on-premise installation of the content management system being protected from access by external users by a firewall, and the location being outside of the firewall; and initiating a synchronization between the on-premise content and the cloud copy of the on-premise content from an on-premise installation while maintaining the firewall to ensure select on-premise content is not synchronized, the synchronization comprising:

providing, during a first communication, an identifier associated with a content item that has changed, without providing specifics about nature of the change, as related to the on-premise content or the cloud copy in the other of the on-premise content and the cloud copy, the change comprising at least one of a content change and a metadata change;

pushing an indication of corresponding changes to the on-premise content to the cloud-based installation; and pulling an indication of the corresponding changes to the cloud copy of the on-premise content from the cloud-based installation to the on-premise installation.

15. The system in accordance with claim 14, wherein the computer hardware comprises at least one programmable processor and a machine-readable medium storing instructions that, when executed by the at least one processor, cause the at least one programmable processor to perform the operations.

16. The system in accordance with claim 14, wherein the operations further comprise:

triggering, upon detection that the cloud workflow has been completed by the location using the cloud copy of the on-premise content, a resumption of the on-premise workflow using the synchronization between the on-premise content and the cloud copy of the on-premise content.

17. The system in accordance with claim 14, wherein the operations further comprise:

adding an aspect to all on-premise content associated with the workflow, the aspect comprising a record that designates the on-premise content for the cloud workflow.

18. The system in accordance with claim 14, wherein the operations further comprise:

designating, based on the destination, one or more assignees of a service task to be executed on the cloud copy of the on-premise content, the one or more assignees being associated with the cloud-based installation of the content management system.

19. The system in accordance with claim 18, wherein the service task further designates an outcome that, once completed by the one or more assignees, triggers the resumption of the on-premise workflow.

20. A computer implemented method comprising:

receiving, by one or more processors associated with a cloud-based installation of a content management system, a synchronization initiated by a on-premise installation of the content management system between an on-premise content retained in an on-premise repository managed by the on-premise installation of the content management system and a cloud copy of the on-premise content at a destination comprising a location managed by the cloud-based installation, the synchronization comprising:

providing, during a first communication, an identifier associated with a content item that has changed, without providing specifics about nature of the change, as related to the on-premise content or the cloud copy in the other of the on-premise content and the cloud copy, the on-premise installation of the content management system being protected from access by external users by a firewall, and the location being outside of the firewall, and the specifics about the nature of the change being provided in a second communication;

pushing an indication of corresponding changes to the on-premise content to the cloud-based installation; and pulling an indication of the corresponding changes to the cloud copy of the on-premise content from the cloud-based installation to the on-premise installation;

executing a cloud workflow part of a workflow by the one or more processors, the workflow comprising the cloud workflow and an on-premise workflow relating to the on-premise content, the executing occurring in response to a triggering of the cloud workflow part by the on-premise installation; and sending a notification from the one or more processors to the on-premise installation of the notification indicating that the cloud workflow has been completed by the location using the cloud copy of the on-premise content, the notifying causing the on-premise installation to resume the on-premise workflow using the synchronization between the on-premise content and the cloud copy of the on-premise content from an on-premise installation, while maintaining the firewall to ensure first on-premise content is not synchronized and second on-premise content is synchronized, and providing synchronization options at two or more of site, directory or folder levels.

* * * * *